United States Patent
Molina-Zamora

(10) Patent No.: US 9,303,238 B1
(45) Date of Patent: Apr. 5, 2016

(54) CLEANING COMPOSITION COMPRISING CARNAUBA WAX, FATTY ACID, AND A PUBLISHING AGENT

(71) Applicant: Marcelo Molina-Zamora, Arecibo, PR (US)

(72) Inventor: Marcelo Molina-Zamora, Arecibo, PR (US)

( * ) Notice: Subject to any disclaimer, the term of this patent is extended or adjusted under 35 U.S.C. 154(b) by 0 days.

(21) Appl. No.: 14/620,525

(22) Filed: Feb. 12, 2015

Related U.S. Application Data

(60) Provisional application No. 62/035,012, filed on Aug. 8, 2014.

(51) Int. Cl.
| | | |
|---|---|---|
| C11D 1/20 | (2006.01) |
| C11D 9/20 | (2006.01) |
| C11D 3/382 | (2006.01) |
| C11D 3/04 | (2006.01) |
| C11D 3/38 | (2006.01) |
| C11D 3/20 | (2006.01) |
| C11D 3/12 | (2006.01) |

(52) U.S. Cl.
CPC ............... *C11D 3/382* (2013.01); *C11D 3/044* (2013.01); *C11D 3/1213* (2013.01); *C11D 3/2075* (2013.01); *C11D 3/38* (2013.01)

(58) Field of Classification Search
CPC ....................................................... C11D 1/20
See application file for complete search history.

(56) References Cited

U.S. PATENT DOCUMENTS

| | | | | |
|---|---|---|---|---|
| 2004/0235699 A1* | 11/2004 | Torres Moreno | ...... | C11D 1/523 510/243 |
| 2005/0159325 A1* | 7/2005 | Maillie | ................ | C11D 3/0078 510/243 |
| 2006/0283094 A1* | 12/2006 | Crissey | .................... | C09G 1/02 51/307 |
| 2009/0042761 A1* | 2/2009 | Zeisbrich | ............. | C11D 3/1206 510/163 |
| 2011/0265830 A1* | 11/2011 | Gonzalez | .................. | B08B 9/00 134/26 |
| 2012/0097100 A1* | 4/2012 | Ryan | ....................... | F21S 48/31 118/620 |

\* cited by examiner

*Primary Examiner* — Charles Boyer
(74) *Attorney, Agent, or Firm* — Hector M Reyes Rivera

(57) ABSTRACT

A headlight lens surface cleaner composition which cleans and restores the dirt and oxidation layers restoring the transparency of the lens that is also useful in cleaning and shinning chromium plated surfaces. The composition includes vanilla extracts or flavoring vanilla imitation solution, fatty acid, preferable coconut oil, carnauba wax, calcium oxide and aqueous diluted ammonia.

6 Claims, No Drawings

CLEANING COMPOSITION COMPRISING CARNAUBA WAX, FATTY ACID, AND A PUBLISHING AGENT

CROSS-NOTING TO RELATED APPLICATIONS

The present application claims the benefit of priority to U.S. Provisional Application 62/035,012, entitled "Cleaning Composition for Plastic Surfaces", filed on Aug. 8, 2014, which is incorporated herein by reference in its entirety.

TECHNICAL FIELD OF THE INVENTION

This invention relates to cleaning composition. More particular, the invention is directed to a composition useful in cleaning and restoring surfaces particularly of plastic materials, such as vehicle headlight covers.

BACKGROUND OF THE INVENTION

Nowadays, most of the vehicles headlights covers are made of polycarbonate or similar hard plastic polymer materials in place of glass. The introduction of plastic in the manufacture of such covers represented a series of advantages based upon the nature of the plastic itself in comparison to glass: a more economical, lightweight, strong, resistant, durable and moldable material.

Despite of such advantages, over time, such covers are impacted negatively by the natural elements altering its bright and clear appearance and becoming foggy or yellowed, thus deteriorating its external surface. Particularly, the exposure of the plastic covers to UV rays and heat from the sun and from the bulbs promotes the oxidation and discoloring of its plastic external surface, affecting negatively the utility of the cover by not allowing the proper passing of the light through said covers.

Thus, there is a need for providing a composition that simultaneously cleans and polish said external surface of the headlight covers in a manner that the utility of vehicles headlights is restored.

OBJECTS AND SUMMARY OF THE INVENTION

It is an object of the invention to provide a composition for cleaning external plastic surfaces. It is another object of the invention to provide a cleaning composition capable of removing and simultaneously polish the oxidation layer produced by the oxidation process affecting the external surfaces of plastics such as polycarbonates and the like. Another object of the invention is to provide a composition capable of cleaning, restoring and polishing the external surfaces of vehicle light covers in a fast and easy manner. The foregoing and other objects, features and advantages of the instant invention will appear more fully herein after from a consideration of the detailed description that follows.

DETAILED DESCRIPTION OF THE EMBODIMENTS

The following detailed description illustrates the invention and a variety of embodiments by way of example and is not limited to the particular limitations presented herein as principles of the invention. This description is directed to enable one skilled in the art to make and use the invention by describing embodiments, adaptations, variations and alternatives of the invention. Any potential variations of the limitations herein described are within the scope of the invention.

In general terms, the instant invention is directed to a chemical composition suitable for cleaning oxidized and cloudy polycarbonate and similar hard plastic surfaces. It also has been found useful in cleaning chromium-plated surfaces.

Said composition comprises at least the following components: dilute aqueous solution of ammonia or an ammonium salt; carnauba wax; one or more fatty acids, a polishing agent and vanilla extract or vanilla imitation flavor composition. Said components may be combined in different steps or in different manners known in the art in order to provide the herein described composition.

Regarding the components comprising the instant composition, the dilute aqueous solution of ammonia may be prepared by diluting ammonia with water, at 5 to 40 percent and more preferable at 8 to 25 percent and even more preferable at 10%. The ammonia in this the diluted aqueous solution may be substituted by ammonium salt such as ammonium acetate. In the prefer embodiments of the invention, the volume per volume percent (V/V %) of said dilute aqueous solution ammonia or an ammonium salt in the composition is in the range of 30 to 40%; and more preferably of 34 to 38 V/V %.

Regarding the carnauba wax, it may be used in powder, liquid or any other psychical state. Nonetheless it is preferable used in a liquid at a range of 15 to 25 volume per volume percent (V/V) % and more preferably 18 v/v %.

On the other hand, the required fatty acid as defined herein may be a single or a mixture of fatty acid from a natural or synthetic nature. For the instant invention, it is preferable the use of commercial coconut oil, although it may be replaced by other similar fatty acid(s). The prefer amount of said fatty acid in the composition may be varied in a range of 1 to 4 volume to volume percent, and more variable of 2.40 v/v %.

The vanilla extract refers to basically a solution containing vanillin as the primary ingredient, usually obtained by macerating and percolating vanilla beans in a solution of ethyl alcohol and water. Due to its high price, the vanilla extract may be replaced by flavoring vanilla imitation composition, which usually contains synthetic vanillin or vanillin derivatives and other preservatives. For instance, it may comprises a mixture of vanillin and/or ethyl vanillin with other known preservatives in smaller amounts, such as ethyl alcohol, methyl coumarin or coumarin and caramel color all of such components being dissolved in water; as disclosed in well known in the art references, see for instant, U.S. Pat. No. 2,448,896 to Levy issued on Sep. 7, 1948. Both of said products are commercially available and usually used in the food industry. The preferable amount of said vanilla or flavoring vanilla imitation in the herein disclosed composition is in the range of 30 to 40 volume per volume percent (V/V) % and more preferably of 32 to 38 V/V %.

Regarding the required polishing agent, calcium oxide may be used and it may be substituted by any other micro-granulated substance such as sand, stone powder or any metal powder. Essentially, it is required that it does not freely or completely dissolve in the composition media. The preferably range of calcium oxide used in the composition is in the range of 4 to 8 weight percent and more preferable 5 to 7 weight %.

The composition may be obtained after combining and mixing the herein described components by any methods or procedures known in the art and in any potential order or variations, being all of said potential variations within the scope of the invention.

The following procedures are presented in a manner of examples of producing the cleaning composition herein disclosed, with the clear understanding that such examples are illustrative and in any manner limit the scope of the invention.

Example 1

120 ml of vanilla imitation composition commercially available under trademark Belca® or Bakers® are added to 60 ml of carnauba wax and 120 ml of 10 percent dilute aqueous ammonia. After combining said components, 23 grams of calcium oxide are added and mixed. To the resulting combination, 8 ml of coconut oil are added and mix to provide the composition.

Example 2

Eight ml of coconut oil are combined with 62 ml of carnauba wax and the mixture is stirred until a homogeneous solution is obtained. 122 ml of vanilla imitation composition Belca® or Bakers® is added followed by the addition of 125 ml of 10 percent liquid dilute ammonia. After stirring, to the obtained solution 22 grams of calcium oxide are added in order to obtain the composition.

Example 3

In an alternative method, the composition may also be prepared by mixing up two different solutions previously prepared:
  A first solution is prepared by combining 120 ml of vanilla imitation with 122 ml of 10 percent dilute ammonia providing a first solution.
  A second solution is prepared by combining eight ml of coconut oil with 60 ml of carnauba wax.

The first solution and the second solution are combined and mixed, to which 20 grams of calcium oxide are added and mixed, thus providing the composition.

In operational terms, the resulting composition may be apply on a dry and clean suitable cleaning cloth and spread over the surface of hard plastic, preferably in circular motions. Once the surface is clear, remove the excess of composition with a clean cleaning cloth, providing a clear and clean external surface.

While the invention has been described in conjunction with some embodiments, it is to be understood that many alternatives, modifications, and variations will be apparent to those skilled in the art in light of the forgoing description. Accordingly, the invention is intended to embrace all such alternatives, modifications and variations falling within the spirit and scope of the appended claims.

What is claim is:

1. A composition useful in cleaning an restoring headlight lens and chromium-plated surfaces, said composition comprising:
   a) dilute aqueous solution of ammonia;
   b) carnauba wax;
   c) one or more fatty acid;
   d) a polishing agent and;
   e) a natural or synthetic vanilla aqueous solution.

2. The composition as recited in claim 1, wherein the vanilla aqueous solution is a flavoring imitation vanilla solution.

3. The composition as recited in claim 2, wherein the fatty acid is coconut oil.

4. The composition as recited in claim 1, wherein the polishing agent is calcium oxide.

5. A composition useful in cleaning an restoring headlight lens and chromium-plated surfaces, said composition comprising:
   a) 30 to 40 volume per volume percent of dilute aqueous solution of ammonia, wherein the ammonia is diluted at 8 to 25%;
   b) 15 to 25 volume per volume percent of carnauba wax;
   c) 1 to 4 volume to volume percent of coconut oil;
   d) 4 to 8 weight percent of calcium oxide and;
   e) 30 to 40 volume per volume percent of flavoring vanilla imitation.

6. The composition as recited in claim 5, wherein the aqueous solution of ammonia is substituted by an aqueous solution of ammonium acetate.

* * * * *